(12) United States Patent
Sakamoto et al.

(10) Patent No.: US 12,487,212 B2
(45) Date of Patent: Dec. 2, 2025

(54) GAS CHROMATOGRAPH AND CARRIER GAS USAGE AMOUNT DISPLAY METHOD

(71) Applicant: SHIMADZU CORPORATION, Kyoto (JP)

(72) Inventors: Yuki Sakamoto, Kyoto (JP); Yu Nagao, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 315 days.

(21) Appl. No.: 18/354,013

(22) Filed: Jul. 18, 2023

(65) Prior Publication Data

US 2024/0102974 A1   Mar. 28, 2024

(30) Foreign Application Priority Data

Sep. 26, 2022  (JP) ................. 2022-153041

(51) Int. Cl.
*G01N 30/32*   (2006.01)
*G01N 30/02*   (2006.01)

(52) U.S. Cl.
CPC ....... *G01N 30/32* (2013.01); *G01N 2030/025* (2013.01); *G01N 2030/324* (2013.01)

(58) Field of Classification Search
None
See application file for complete search history.

(56) References Cited

U.S. PATENT DOCUMENTS

| 8,656,754 B2 * | 2/2014 | Kawana ............ G01N 30/8658 |
| | | 73/23.36 |
| 2018/0238840 A1 | 8/2018 | Masuda |
| 2021/0270786 A1 | 9/2021 | Kisaka et al. |

FOREIGN PATENT DOCUMENTS

| CN | 113465814 A | * 10/2021 | ............. G01N 30/02 |
| JP | 2014-185953 A | 10/2014 | |

OTHER PUBLICATIONS

Extended European Search Report issued Feb. 12, 2024 in Application No. 23189904.8.

* cited by examiner

*Primary Examiner* — Daniel S Larkin
(74) *Attorney, Agent, or Firm* — Sughrue Mion, PLLC (57) ABSTRACT

A gas chromatograph includes a sample gas generator, a separation column configured to separate components of an introduced sample gas, a gas supply source configured to supply a carrier gas to the sample gas generator to carry the sample gas from the sample gas generator to the separation column when the components of the sample gas are analyzed, a controller configured or programmed to acquire an in-analysis usage amount of the carrier gas based on an analysis time for analyzing the components of the sample gas, and a flow rate of the carrier gas supplied from the gas supply source to the sample gas generator, and a display configured to display the in-analysis usage amount acquired by the controller.

11 Claims, 6 Drawing Sheets

FIRST EMBODIMENT

FIG.1
FIRST EMBODIMENT

```
CARRIER GAS: He                                                    G3
   SPLIT
                      Aw                                    Tw
CARRIER GAS    [ 10 ] mL/min    WAITING TIME      [ 80 ] min
FLOW RATE
                      Aw1       IN-WAITING                  Au3
COLUMN         [ 0.5 ] mL/min   USAGE AMOUNT      [ 800 ] mL
FLOW RATE
                      Aw2
PURGE          [ 4.5 ] mL/min
FLOW RATE
                      Aw3
SPLIT RATIO    [ 10.0 ]
```

FIG.6

```
                                                                   G4
                                    Ae1
   CURRENT STATUS/INDICATION         TOTAL           262 L
        OF REPLACEMENT           Ae2 USAGE AMOUNT
Vg                                   DAILY           ABOUT 1.6 L/DAY
    SEPTUM              0/100th  Ae3 USAGE AMOUNT
    GAS CYLINDER                     CURRENT         240 mL/h
    VOLUME              7.0m³    Ae4 USAGE AMOUNT
                                     ESTIMATED       13 DAYS
                                     REMAINING DAYS
```

FIG.8 SECOND EMBODIMENT

FIG.11
MODIFIED EXAMPLE

| CURRENT STATUS/ INDICATION OF REPLACEMENT | | |
|---|---|---|
| SEPTUM | 0/100th | |
| GAS CYLINDER VOLUME | 7.0m³ | |

| | | |
|---|---|---|
| Ae1 | TOTAL USAGE AMOUNT | 262 L |
| Ae2 | DAILY USAGE AMOUNT | ABOUT 1.6 L/DAY |
| Ae3 | CURRENT USAGE AMOUNT | 240 mL/h |
| Ae4 | ESTIMATED REMAINING DAYS | 13 DAYS |
| Ae5 | WEEKLY USAGE AMOUNT | ABOUT 11.2 L/WEEK |
| Ae6 | MONTHLY USAGE AMOUNT | ABOUT 48 L/MONTH |
| Ae7 | REMAINING AMOUNT IN CYLINDER | ABOUT 4.0 m³ |

GAS CHROMATOGRAPH AND CARRIER GAS USAGE AMOUNT DISPLAY METHOD

CROSS-REFERENCE TO RELATED APPLICATIONS

This application claims the benefit of priority to Japanese Patent Application No. 2022-153041 filed on Sep. 26, 2022. The entire contents of this application are hereby incorporated herein by reference.

BACKGROUND OF THE INVENTION

Field of the Invention

The present invention relates to a gas chromatograph and a carrier gas usage amount display method, and more particularly, it relates to a gas chromatograph including a gas supply source that supplies a carrier gas and a carrier gas usage amount display method.

Description of the Background Art

Conventionally, a gas chromatograph including a gas supply source that supplies a carrier gas is known. Such a gas chromatograph is disclosed in Japanese Patent Laid-Open No. 2014-185953, for example.

Japanese Patent Laid-Open No. 2014-185953 discloses a gas chromatograph including a gas cylinder (gas supply source) that supplies a carrier gas. This gas chromatograph includes a sample vaporizing chamber, a column (separation column), the gas cylinder, and a pressure gauge. The sample vaporizing chamber vaporizes an injected sample to produce a sample gas. The column separates components of the sample gas. The gas cylinder is filled with a carrier gas for introducing the sample gas into the column. The pressure gauge is attached to the gas cylinder to detect a pressure inside the gas cylinder. In the gas chromatograph, when the sample gas vaporized in the sample vaporizing chamber is analyzed, the carrier gas is flowed from the gas cylinder such that the sample gas is introduced together with the carrier gas from the sample vaporizing chamber into the column.

Although not clearly described in Japanese Patent Laid-Open No. 2014-185953, in a conventional gas chromatograph as described in Japanese Patent Laid-Open No. 2014-185953, an operator goes to a location at which a gas cylinder is arranged and periodically records the remaining amount of carrier gas in the gas cylinder calculated from a detection value detected by a pressure gauge after checking the detection value. In this case, the operator can know the usage amount of a carrier gas in analyzing components of a sample gas from a difference in the recorded remaining amount of carrier gas, but must go to a location at which a gas supply source is arranged and check the detection value detected by the pressure gauge. Thus, it is troublesome to know the usage amount of the carrier gas in analyzing the components of the sample gas. Therefore, it is desired to easily know the usage amount of the carrier gas in analyzing the components of the sample gas.

SUMMARY OF THE INVENTION

The present invention is intended to solve the above problem. The present invention aims to provide a gas chromatograph and a carrier gas usage amount display method that each enable the usage amount of a carrier gas in analyzing components of a sample gas to be easily known.

In order to attain the aforementioned object, a gas chromatograph according to a first aspect of the present invention includes a sample gas generator configured to generate a sample gas from an injected sample, a separation column connected such that the sample gas generated in the sample gas generator is introduced thereinto and configured to separate components of the introduced sample gas, a gas supply source configured to supply a carrier gas to the sample gas generator to carry the sample gas from the sample gas generator to the separation column when the components of the sample gas are analyzed, a controller configured or programmed to acquire an in-analysis usage amount of the carrier gas based on an analysis time for analyzing the components of the sample gas, and a flow rate of the carrier gas supplied from the gas supply source to the sample gas generator, and a display configured to display the in-analysis usage amount acquired by the controller.

A carrier gas usage amount display method according to a second aspect of the present invention includes acquiring an in-analysis usage amount of a carrier gas based on an analysis time for analyzing a sample gas generated from a sample in a sample gas generator, and a flow rate of the carrier gas supplied from a gas supply source to the sample gas generator to carry the sample gas to a separation column, and displaying the in-analysis usage amount on a display.

In the gas chromatograph according to the first aspect and the carrier gas usage amount display method according to the second aspect, as described above, the in-analysis usage amount of the carrier gas is acquired based on the analysis time for analyzing the components of the sample gas and the flow rate of the carrier gas supplied from the gas supply source to the sample gas generator, and the acquired in-analysis usage amount is displayed. Accordingly, a user can check the in-analysis usage amount on the display without going to a location at which the gas supply source is arranged, and thus the user can easily know the usage amount of the carrier gas in analyzing the components of the sample gas.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

First Embodiment

The configuration of a gas chromatograph 100 according to a first embodiment of the present invention is now described with reference to FIGS. 1 to 7.

Figure 1:
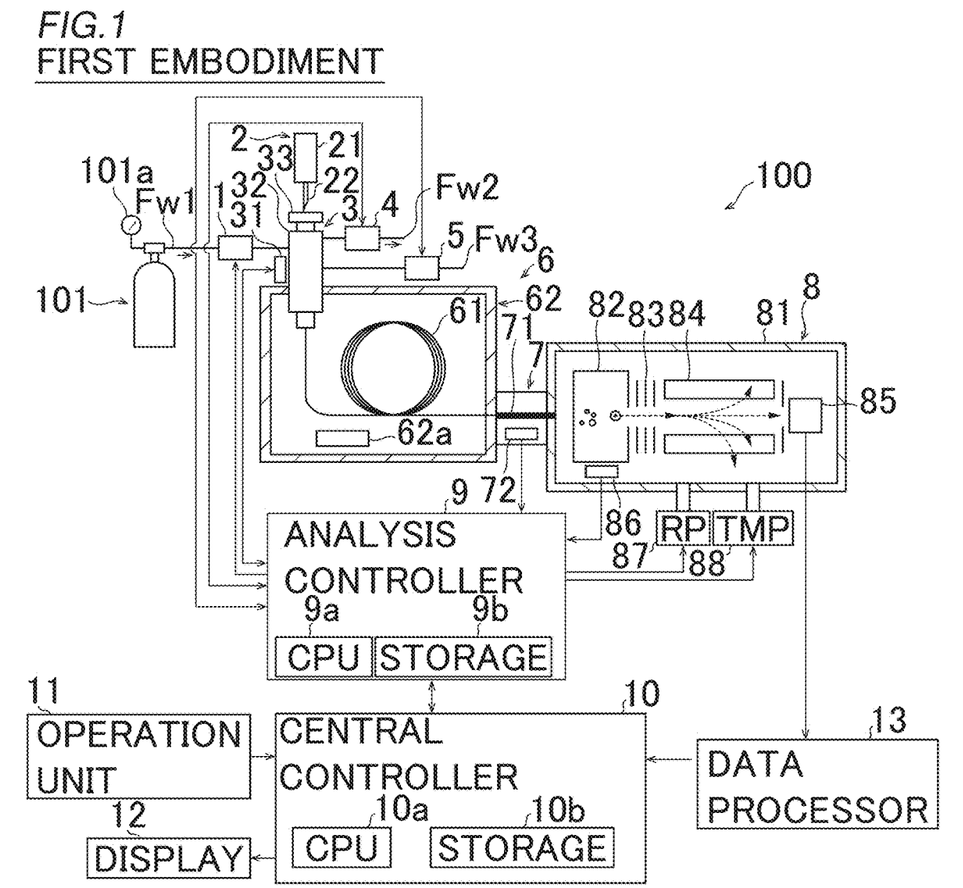
FIG. 1 is a schematic view showing the configuration of a gas chromatograph according to a first embodiment.

As shown in FIG. 1, the gas chromatograph 100 is an apparatus that analyzes a sample gas obtained by vaporizing a sample such as food, a metabolite, or a biological sample. The gas chromatograph 100 is used to perform analysis such as analysis of volatile organic compounds (VOCs) in water, analysis of pesticide residues in food, metabolite analysis (metabolomics) of animals (plants), and analysis of medicinal toxicants in biological samples.

In the gas chromatograph 100, it is necessary to flow a carrier gas, which is an inert gas, in order to carry the sample gas when components of the sample gas are analyzed. Therefore, a gas cylinder 101 is connected to the gas chromatograph 100. The gas cylinder 101 is a container filled with a carrier gas. The carrier gas is helium gas, for example. The gas cylinder 101 is connected to supply the carrier gas to the gas chromatograph 100 through a carrier gas introduction flow path Fw1. A pressure gauge 101a is attached to the gas cylinder 101 to detect a pressure inside the gas cylinder 101. The gas cylinder 101 is an example of a "gas supply source" in the claims.

Specifically, the gas chromatograph 100 includes a gas flow controller 1, an autosampler 2, a sample gas generator 3, a purge flow controller 4, a split flow controller 5, a separation column 6, an interface 7, a detector 8, an analysis controller 9, a central controller 10, an operation unit 11, a display 12, and a data processor 13. The central controller 10 is an example of a "controller" in the claims.

The gas flow controller 1 is a flow controller that controls the flow rate or pressure of the carrier gas to be supplied from the gas cylinder 101 to the sample gas generator 3. The gas flow controller 1 is attached to the carrier gas introduction flow path Fw1.

The autosampler 2 automatically injects a sample into the sample gas generator 3. The autosampler 2 includes a syringe 21 that stores a liquid sample and a needle 22 that injects a small amount of liquid sample into the sample gas generator 3. In the autosampler 2, the needle 22 is inserted into the sample gas generator 3 such that the liquid sample in the syringe 21 is injected into the sample gas generator 3.

The sample gas generator 3 generates a sample gas from the injected sample. The sample gas generator 3 includes a heater 31, a septum 32, and a sample vaporizing chamber 33. The heater 31 heats the sample vaporizing chamber 33 to a temperature at which the sample can be vaporized. The septum 32 is a partition that prevents the sample from leaking from the sample vaporizing chamber 33 when the needle 22 is inserted into the sample gas generator 3. The sample vaporizing chamber 33 is a container that temporarily stores the generated sample gas.

The sample gas generator 3 is connected to a first carrier gas discharge flow path Fw2 such that a gas emitted from the septum 32 by heating the sample vaporizing chamber 33 by the heater 31 is discharged together with the carrier gas to the outside of the sample vaporizing chamber 33. In order to adjust the amount of supply of the generated sample gas to the separation column 6, the sample gas generator 3 is connected to a second carrier gas discharge flow path Fw3 such that the generated sample gas is discharged together with the carrier gas to the outside.

The purge flow controller 4 is a flow controller that controls the flow rate of the first carrier gas discharge flow path Fw2. The purge flow controller 4 is attached to the first carrier gas discharge flow path Fw2. The split flow controller 5 is a flow controller that controls the flow rate of the second carrier gas discharge flow path Fw3. The split flow controller 5 is attached to the second carrier gas discharge flow path Fw3.

The separation column 6 separates components of the sample gas introduced from the sample gas generator 3. Thus, the separation column 6 is connected to the sample gas generator 3 such that the sample gas generated in the sample gas generator 3 is introduced into the separation column 6.

Specifically, the separation column 6 includes a column 61 and a column oven 62. The column 61 is a capillary column. The column 61 connects a downstream end of the sample vaporizing chamber 33 to the interface 7. The column oven 62 is a heating device that heats the column 61 by heating the inside of the column oven 62 with a heater 62a. The column 61 is housed in the column oven 62.

The interface 7 smoothly flows the sample gas from the separation column 6 toward the detector 8 by heating a sample gas introduction pipe 71 through which the sample gas passes with a heater 72. The interface 7 connects the separation column 6 to the detector 8. The sample gas introduction pipe 71 connects a downstream end of the column 61 to the detector 8.

The detector 8 detects each component separated in the separation column 6. In this case, the detector 8 is a mass spectrometer (MS). The detector 8 includes a chamber 81, an ion source 82, ion lenses 83, a quadrupole mass filter 84, an ion detector 85, a heater 86, a rotary pump 87, and a turbomolecular pump 88.

The chamber 81 houses the ion source 82, the ion lenses 83, the quadrupole mass filter 84, the ion detector 85, and the heater 86. The inside of the chamber 81 is evacuated to a substantially vacuum state by a vacuum pump including the rotary pump 87 (indicated by RP in FIG. 1) and the turbomolecular pump 88 (indicated by TMP in FIG. 1). The ion source 82 generates ions from the sample gas. The ion lenses 83 converge and transport the ions generated by the ion source 82. The quadrupole mass filter 84 separates the ions according to their mass-to-charge ratios m/z by four rod electrodes. The ion detector 85 detects the ions passing through the quadrupole mass filter 84. The heater 86 heats the ion source 82.

The analysis controller 9 performs a control to analyze the sample by controlling the operations of the gas flow controller 1, the autosampler 2, the sample gas generator 3, the purge flow controller 4, the split flow controller 5, the separation column 6, the interface 7, and the detector 8. The analysis controller 9 includes a central processing unit (CPU) 9a, and a storage 9b including memories such as a read-only memory (ROM) and a random access memory (RAN), and a hard disk drive (HDD).

The central controller 10 receives an input operation to the operation unit 11 by a user, and performs a control to display predetermined information on the display 12 based on the received input operation, for example. The central controller 10 performs a control to transmit signals for starting and terminating analysis of the sample gas to the analysis controller 9. The central controller 10 performs a control to transmit analysis conditions for analysis of the sample gas to the analysis controller 9. The operation unit 11 includes pointing devices such as a keyboard and a mouse, for example. The display 12 is a liquid crystal display, for example.

The central controller 10 includes a CPU 10a and a storage 10b including memories such as a ROM and a RAM, and an HDD.

The data processor 13 performs a control to transmit processed digital data obtained by processing a detection signal detected by the ion detector 85 and converted into digital data by an A/D converter (not shown) to the central controller 10. The data processor 13 includes a CPU and memories such as a ROM and a RAM (not shown).

In-Analysis Carrier Gas Usage Amount Display Screen

Figure 2:
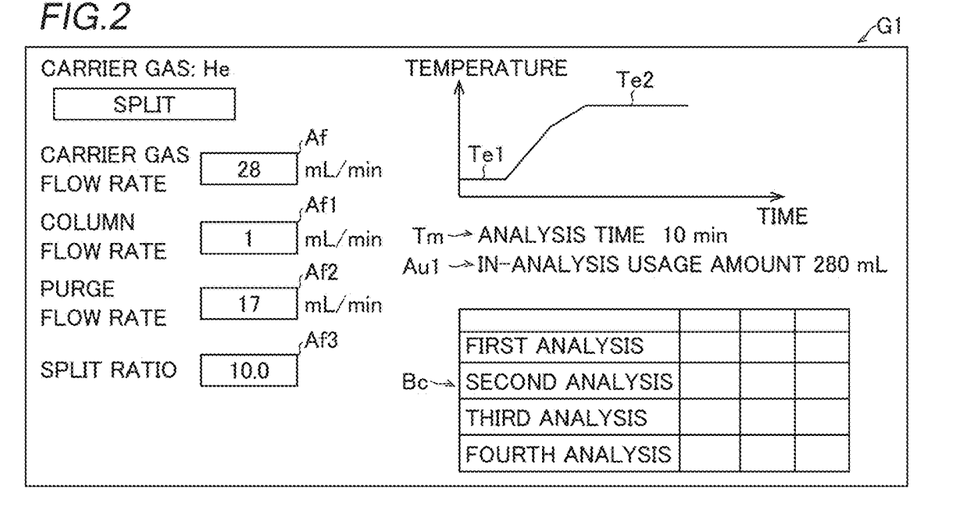
FIG. 2 is a schematic view showing an in-analysis carrier gas usage amount display screen for making settings for split analysis displayed on a display of the gas chromatograph according to the first embodiment.
Figure 3:
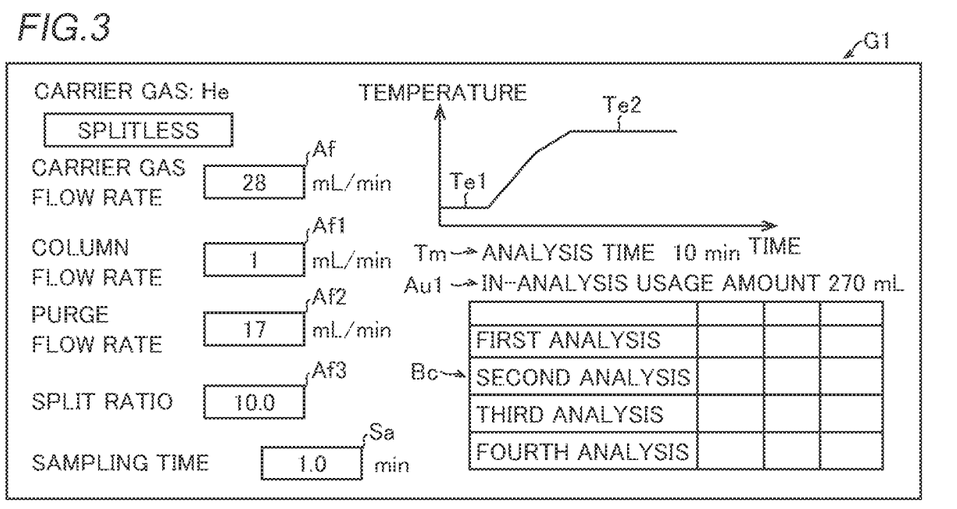
FIG. 3 is a schematic view showing an in-analysis carrier gas usage amount display screen for making settings for splitless analysis displayed on the display of the gas chromatograph according to the first embodiment.

As shown in FIGS. 2 and 3, the central controller 10 according to the first embodiment performs a control to display an in-analysis carrier gas usage amount display screen G1 showing an estimate value of the usage amount of the carrier gas used in analyzing the sample gas on the display 12 before analyzing the sample gas. The in-analysis carrier gas usage amount display screen G1 is a screen for allowing the user to recognize the usage amount of the carrier gas used in analyzing the sample. FIGS. 2 and 3 show the in-analysis carrier gas usage amount display screen G1 showing the settings for one analysis in batch analysis in which analysis of the components of the sample gas is sequentially performed a plurality of times, as an example of analysis of the sample gas.

In an example of the batch analysis in FIGS. 2 and 3, four batch analyses, which are first to fourth analyses, are shown in a batch analysis condition field Bc on the in-analysis carrier gas usage amount display screen G1. In the batch analysis condition field Bc, a temperature for the batch analysis is shown, for example. Thus, the example of the batch analysis in FIGS. 2 and 3 shows that four analyzes, which are the first to fourth analyses, are sequentially performed. In the batch analysis, two, three, or five or more analyzes may be sequentially performed.

Split shown on the in-analysis carrier gas usage amount display screen G1 in FIG. 2 indicates split analysis. The split analysis indicates analysis in which the sample gas is analyzed while a portion of the sample gas vaporized in analysis is flowed into the separation column 6 and the remaining sample gas is discharged through the second carrier gas discharge flow path Fw3. Splitless shown on the in-analysis carrier gas usage amount display screen G1 in FIG. 3 indicates splitless analysis. The splitless analysis indicates analysis in which the sample gas is analyzed while the vaporized sample gas is flowed into the separation column 6 with the second carrier gas discharge flow path Fw3 closed for a predetermined period of time (sampling time) from the start of analysis, and then the second carrier gas discharge flow path Fw3 is opened, a portion of the vaporized sample gas is flowed into the separation column 6, and the remaining sample gas is discharged through the second carrier gas discharge flow path Fw3.

An in-analysis usage amount Au1 of the carrier gas shown on the in-analysis carrier gas usage amount display screen G1 showing the settings for one analysis is acquired by the processing of the central controller 10 based on an analysis time Tm for analyzing the components of the sample gas and the flow rate Af of the carrier gas supplied from the gas cylinder 101 to the sample gas generator 3.

The analysis time Tm and the flow rate Af of the carrier gas are now described.

The analysis time Tm corresponds to the sum of a detection time and a preparation time. That is, in the analysis of the components of the sample gas, the temperature of the column oven 62 of the separation column 6 is raised from an initial first temperature Te1 to a second temperature Te2 and maintained, and then the temperature is lowered from the second temperature Te2 to the initial first temperature Te1 for the next analysis. A period of time during which the temperature is raised from the initial first temperature Te1 to the second temperature Te2 and maintained corresponds to the detection time for detecting the components of the sample gas obtained by vaporizing the sample. A period of time during which the temperature is lowered from the second temperature Te2 to the initial first temperature Te1 for the next analysis corresponds to the preparation time. Therefore, the analysis time Tm corresponds to a period of time during which the temperature is raised from the initial first temperature Te1 to the second temperature Te2 and maintained to detect the components of the sample gas, and then the temperature is lowered from the second temperature Te2 to the initial first temperature Te1 for the next analysis. Each of the detection time and the preparation time is recorded in an analysis condition file in which numerical values preset by the user have been registered prior to analysis of the components of the sample gas. As for the analysis time Tm, a numerical value calculated based on the detection time and the preparation time is recorded in the analysis condition file.

As shown in FIG. 2, the flow rate Af of the carrier gas is acquired based on a column flow rate Af1, a purge flow rate Af2, and a split ratio Af3 when the components of the sample gas are analyzed by the split analysis. The column flow rate Af1 refers to the flow rate of the carrier gas that flows through the column 61 when analysis is performed. The purge flow rate Af2 refers to the flow rate of the carrier gas discharged from the sample gas generator 3 to the outside through the first carrier gas discharge flow path Fw2. The split ratio Af3 refers to a ratio for setting the flow rate (hereinafter referred to as the split discharge amount) of the carrier gas discharged from the sample gas generator 3 to the outside through the second carrier gas discharge flow path Fw3. The split discharge amount discharged to the outside through the second carrier gas discharge flow path Fw3 is acquired by multiplying the column flow rate Af1 by the split ratio Af3. The flow rate Af of the carrier gas is the total flow rate of the column flow rate Af1, the purge flow rate Af2, and the split discharge amount.

An example of calculating a numerical value of the flow rate Af of the carrier gas in a case in which the components of the sample gas are analyzed by the split analysis is shown. For example, the user performs an input operation to set the column flow rate Af1 to 1 [mL/min] in a field of the column flow rate Af1 of the in-analysis carrier gas usage amount display screen G1. For example, the user performs an input operation to set the purge flow rate Af2 to 17 [mL/min] in a field of the purge flow rate Af2 of the in-analysis carrier gas usage amount display screen G1. For example, the user performs an input operation to set the split ratio Af3 to 10 in a field of the split ratio Af3 of the in-analysis carrier gas usage amount display screen G1. From these, the flow rate Af (total flow rate) of the carrier gas is calculated to be 28 [mL/min]. Consequently, the in-analysis usage amount Au1 is calculated to be 280 [mL] by multiplying the flow rate Af of the carrier gas by the analysis time Tm.

As shown in FIG. 3, the flow rate Af of the carrier gas is acquired based on the column flow rate Af1, the purge flow rate Af2, the split ratio Af3, and the sampling time Sa when the components of the sample gas are analyzed by the splitless analysis. The column flow rate Af1, the purge flow rate Af2, and the split ratio Af3 are the same as those for the split analysis, and thus description thereof is omitted. The sampling time Sa refers to a period of time during which the split flow controller 5 is closed. The flow rate Af of the carrier gas during the sampling time Sa is acquired by adding the column flow rate Af1 and the purge flow rate Af2.

An example of calculating a numerical value of the flow rate Af of the carrier gas in a case in which the components of the sample gas are analyzed by the splitless analysis is shown. For example, the user performs an input operation to set the column flow rate Af1 to 1 [mL/min] in a field of the column flow rate Af1 of the in-analysis carrier gas usage amount display screen G1. For example, the user performs an input operation to set the purge flow rate Af2 to 17 [mL/min] in a field of the purge flow rate Af2 of the in-analysis carrier gas usage amount display screen G1. For example, the user performs an input operation to set the split ratio Af3 to 10 in a field of the split ratio Af3 of the in-analysis carrier gas usage amount display screen G1. From these, the flow rate Af (total flow rate) of the carrier gas is calculated to be 28 [mL/min]. Furthermore, the user performs an input operation to set the sampling time Sa to 1 [min] in a field of the sampling time Sa of the in-analysis carrier gas usage amount display screen G1, for example. Consequently, the in-analysis usage amount Au1 is calculated to be 270 [mL] by multiplying the flow rate Af of the carrier gas by the analysis time Tm.

The carrier gas flow rate Af, the column flow rate Af1, the purge flow rate Af2, the split ratio Af3, and the analysis time Tm described above are set before analysis of the components of the sample gas. That is, the flow rate Af of the carrier gas, the column flow rate Af1, the purge flow rate Af2, the split ratio Af3, and the analysis time Tm are analysis conditions for analyzing the components of the sample gas.

Thus, as shown in FIGS. 2 and 3, the central controller 10 performs a control to acquire an estimate value of the in-analysis usage amount Au1 based on the analysis conditions including the analysis time Tm and the flow rate Af of the carrier gas and set by the user's input operations, and display the acquired estimate value of the in-analysis usage amount Au1 on the display 12.

Specifically, the central controller 10 performs a control to calculate (acquire) the flow rate Af of the carrier gas based on acquiring each of the column flow rate Af1, the purge flow rate Af2, and the split ratio Af3 set by receiving the user's input operations when the split analysis is performed. Furthermore, the central controller 10 performs a control to calculate (acquire) the flow rate Af of the carrier gas based on acquiring each of the column flow rate Af1, the purge flow rate Af2, the split ratio Af3, and the sampling time Sa set by receiving the user's input operations when the split-less analysis is performed. The column flow rate Af1 is a numerical value related to the flow rate (supply amount) of the carrier gas supplied from the gas cylinder 101 to the separation column 6 via the sample gas generator 3. The purge flow rate Af2, the split ratio Af3, and the sampling time Sa are numerical values related to the carrier gas discharge amount.

In-Batch Analysis Carrier Gas Usage Amount Display Screen

Figure 4:
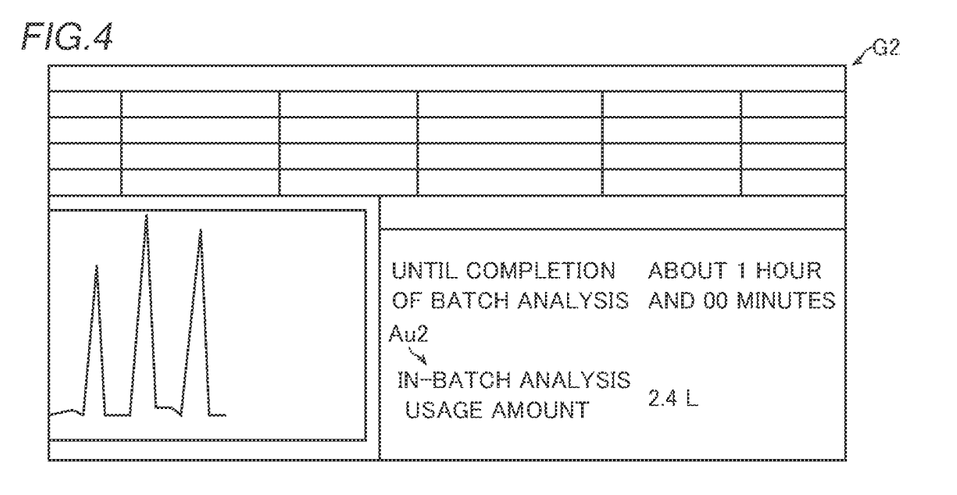
FIG. 4 is a schematic view showing an in-batch analysis carrier gas usage amount display screen displayed on the display of the gas chromatograph according to the first embodiment.

As shown in FIG. 4, the central controller 10 performs a control to display an in-batch analysis carrier gas usage amount display screen G2 showing not only the analysis results of the sample gas and the time required to complete the batch analysis, but also an estimate value of an in-batch analysis usage amount Au2 on the display 12 while analyzing the sample gas. The in-batch analysis carrier gas usage amount display screen G2 is a screen for allowing the user to recognize the usage amount of the carrier gas used in the batch analysis. The in-batch analysis carrier gas usage amount display screen G2 is a window separate from the in-analysis carrier gas usage amount display screen G1.

Specifically, the central controller 10 performs a control to calculate (acquire) an estimate value of the in-batch analysis usage amount Au2 of the carrier gas based on the estimate value of the in-analysis usage amount Au1 for each analysis in the batch analysis in which analysis of the components of the sample gas is sequentially performed a plurality of times, and the number of analyses performed in the batch analysis, and display the calculated (acquired) estimate value of the in-batch analysis usage amount Au2 on the display 12. In FIG. 4, 2.4 L is displayed as an example of the estimate value of the in-batch analysis usage amount Au2, but the estimate value of the in-batch analysis usage amount Au2 is not limited to 2.4 L.

In-Waiting Carrier Gas Usage Amount Display Screen

Figure 5:
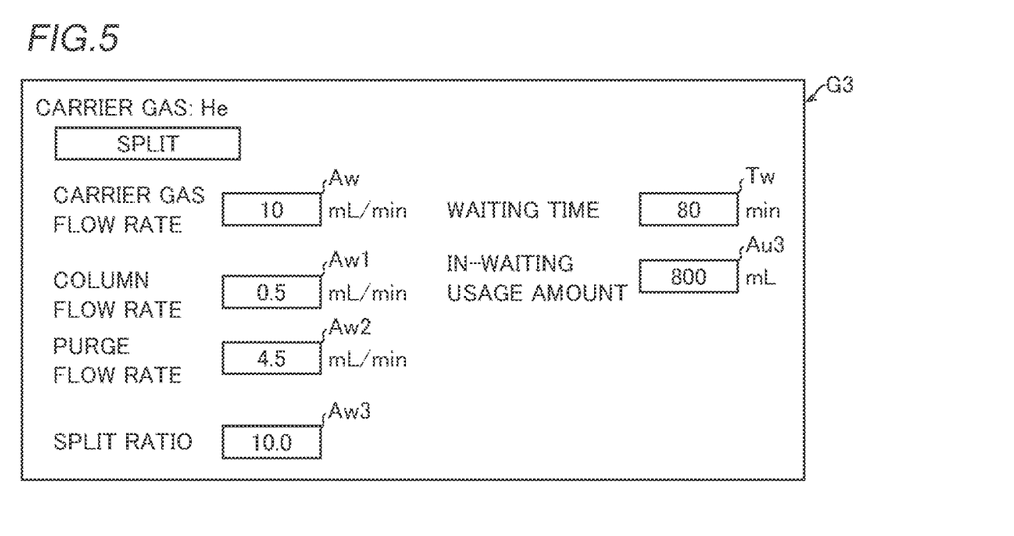
FIG. 5 is a schematic view showing an in-waiting carrier gas usage amount display screen displayed on the display of the gas chromatograph according to the first embodiment.

As shown in FIG. 5, the central controller 10 performs a control to display an in-waiting carrier gas usage amount display screen G3 including an in-waiting usage amount Au3 acquired by the central controller 10 on the display 12 before analyzing the sample gas. The in-waiting carrier gas usage amount display screen G3 is a screen for allowing the user to recognize the usage amount of the carrier gas used when the gas chromatograph 100 is in a waiting state. The in-waiting carrier gas usage amount display screen G3 is a window separate from the in-analysis carrier gas usage amount display screen G1 and the in-batch analysis carrier gas usage amount display screen G2. The waiting state refers to the state of the gas chromatograph 100 in which analysis of the sample gas is not performed. In other words, there is more time than the preparation time before the next analysis is started, and thus the waiting state indicates a state in which the temperature of the gas chromatograph 100 is maintained near the initial temperature of the next analysis from the end of the current analysis to the start of the next analysis.

The in-waiting usage amount Au3 of the carrier gas shown on the in-waiting carrier gas usage amount display screen G3 showing the settings in the waiting state is acquired by the processing of the central controller 10 based on a waiting time Tw during which the components of the sample gas are not analyzed and the flow rate Aw of the carrier gas supplied from the gas cylinder 101 to the sample gas generator 3 in the waiting state. The waiting time Tw indicates a period of time from the end of the current analysis to the start of the next analysis in a case in which there is more time than the preparation time before the next analysis is started. The waiting time Tw is an example of a "duration of a waiting state" in the claims.

The waiting time Tw and the flow rate Aw of the carrier gas are described.

The waiting time Tw is calculated (acquired) by the central controller 10 based on the analysis time Tm. Thus, the waiting time Tw is preset before analysis of the sample gas. The flow rate Aw of the carrier gas is acquired based on the column flow rate Aw1, the purge flow rate Aw2, and the split ratio Aw3 in the waiting state. The column flow rate Aw1, the purge flow rate Aw2, and the split ratio Aw3 correspond to the column flow rate Af1, the purge flow rate Af2, and the split ratio Af3, respectively, and thus description thereof is omitted.

An example of calculating a numerical value of the flow rate Aw of the carrier gas in the waiting state is shown. For example, the user performs an input operation to set the column flow rate Aw1 to 0.5 [mL/min] in a field of the column flow rate Aw1 of the in-waiting carrier gas usage amount display screen G3. For example, the user performs an input operation to set the purge flow rate Aw2 to 4.5 [mL/min] in a field of the purge flow rate Aw2 of the in-waiting carrier gas usage amount display screen G3. For example, the user performs an input operation to set the split ratio Aw3 to 10 in a field of the split ratio Aw3 of the in-waiting carrier gas usage amount display screen G3. In a field of the waiting time Tw of the in-waiting carrier gas usage amount display screen G3, the waiting time Tw is set to 80 [min] based on the analysis time Tm, for example. From these, the flow rate Aw (total flow rate) of the carrier gas is calculated to be 10 [mL/min]. Consequently, an in-waiting usage amount Au3 of 800 [mL] is acquired by multiplying the flow rate Aw of the carrier gas by the waiting time Tw.

The flow rate Aw of the carrier gas, the column flow rate Aw1, the purge flow rate Aw2, the split ratio Aw3, and the waiting time Tw described above are set before analysis of the components of the sample gas. That is, the flow rate Aw of the carrier gas, the column flow rate Aw1, the purge flow rate Aw2, the split ratio Aw3, and the waiting time Tw are waiting conditions for maintaining the functions of the gas chromatograph 100 in the waiting state.

Thus, the central controller 10 performs a control to acquire the estimate value of the in-waiting usage amount Au3 based on the waiting conditions including the waiting time Tw during which the components of the sample gas are not analyzed, which is acquired based on the analysis time Tm, and the flow rate Aw of the carrier gas supplied from the gas cylinder 101 to the sample gas generator 3 in the waiting state, which is set by the user's input operation, and display the acquired estimate value of the in-waiting usage amount Au3 on the display 12.

Other Carrier Gas Usage Amount Information Display Screen

Figure 6:
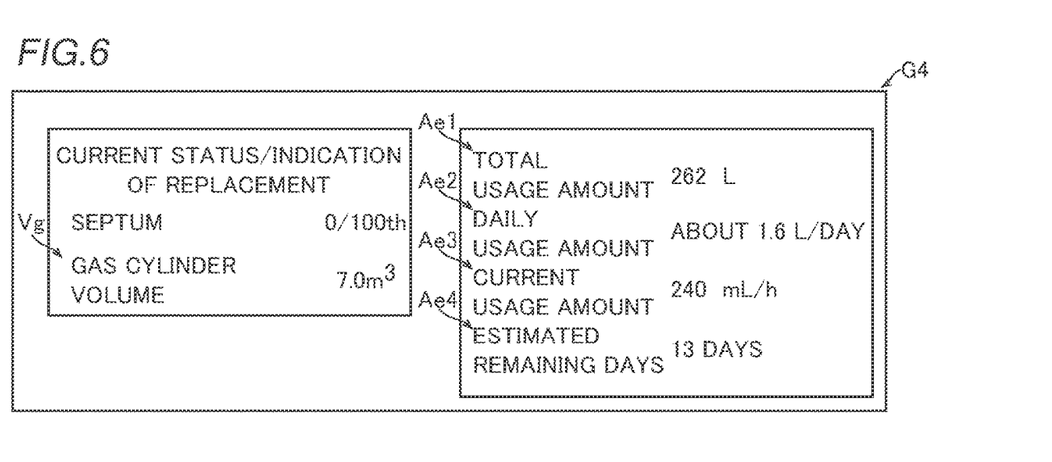
FIG. 6 is a schematic view showing an other carrier gas usage amount information display screen displayed on the display of the gas chromatograph according to the first embodiment.

As shown in FIG. 6, the central controller 10 performs a control to display a carrier gas usage amount information display screen G4 on the display 12 before analyzing the sample gas. The carrier gas usage amount information display screen G4 is a screen for allowing the user to recognize other information regarding the usage amount of the carrier gas. On the carrier gas usage amount information display screen G4, an estimate value of a total usage amount Ae1, an estimate value of a daily usage amount Ae2, an estimate value of a current usage amount Ae3, and a number of estimated remaining days Ae4 are displayed as other carrier gas usage amount information based on the usage amounts of the carrier gas in analysis and waiting. The carrier gas usage amount information display screen G4 is a window separate from the in-analysis carrier gas usage amount display screen G1, the in-batch analysis carrier gas usage amount display screen G2, and the in-waiting carrier gas usage amount display screen G3. The numerical values shown on the carrier gas usage amount information display screen G4 in FIG. 6 are only examples.

The total usage amount Ae1 is acquired by multiplying the number of days that have elapsed since the activation of the gas chromatograph 100 by the estimate value of the daily usage amount Ae2. The daily usage amount Ae2 is acquired by multiplying the number of analyses of the components of the sample gas in one day by the estimate value of the in-analysis usage amount Au1. The current usage amount Ae3 is acquired by dividing the daily usage amount Ae2 by 24 hours. The number of the estimated remaining days Ae4 is acquired by dividing the cylinder volume Vg of the gas cylinder 101 by the estimate value of the daily usage amount. The cylinder volume Vg is acquired in advance by a user's input operation.

Thus, the central controller 10 performs a control to acquire the estimate value of the daily usage amount Ae2 based on the number of analyses of the components of the sample gas in one day and the estimate value of the in-analysis usage amount Au1, and display the acquired estimate value of the daily usage amount Ae2 on the display 12.

The central controller 10 performs a control to acquire the estimate value of the daily usage amount Ae2 based on the number of analyses of the components of the sample gas in one day and the estimate value of the in-analysis usage amount Au1, acquire the estimated remaining days Ae4 left until the gas cylinder 101 becomes empty based on the estimate value of the daily usage amount Ae2 and the cylinder volume Vg of the gas cylinder 101, and display the acquired estimated remaining days Ae4 on the display 12.

The central controller 10 performs a control to reset the usage amount of the carrier gas accumulated for the number of analyses of the components of the sample gas to 0 based on receiving a user's input operation via the operation unit 11 when the empty gas cylinder is replaced. That is, the numerical values of the total usage amount Ae1, the daily usage amount Ae2, the current usage amount Ae3, and the estimated remaining days Ae4 are reset to 0.

Carrier Gas Usage Amount Display Method

A carrier gas usage amount display method implemented by the central controller 10 is now described below with reference to FIG. 7.

Figure 7:
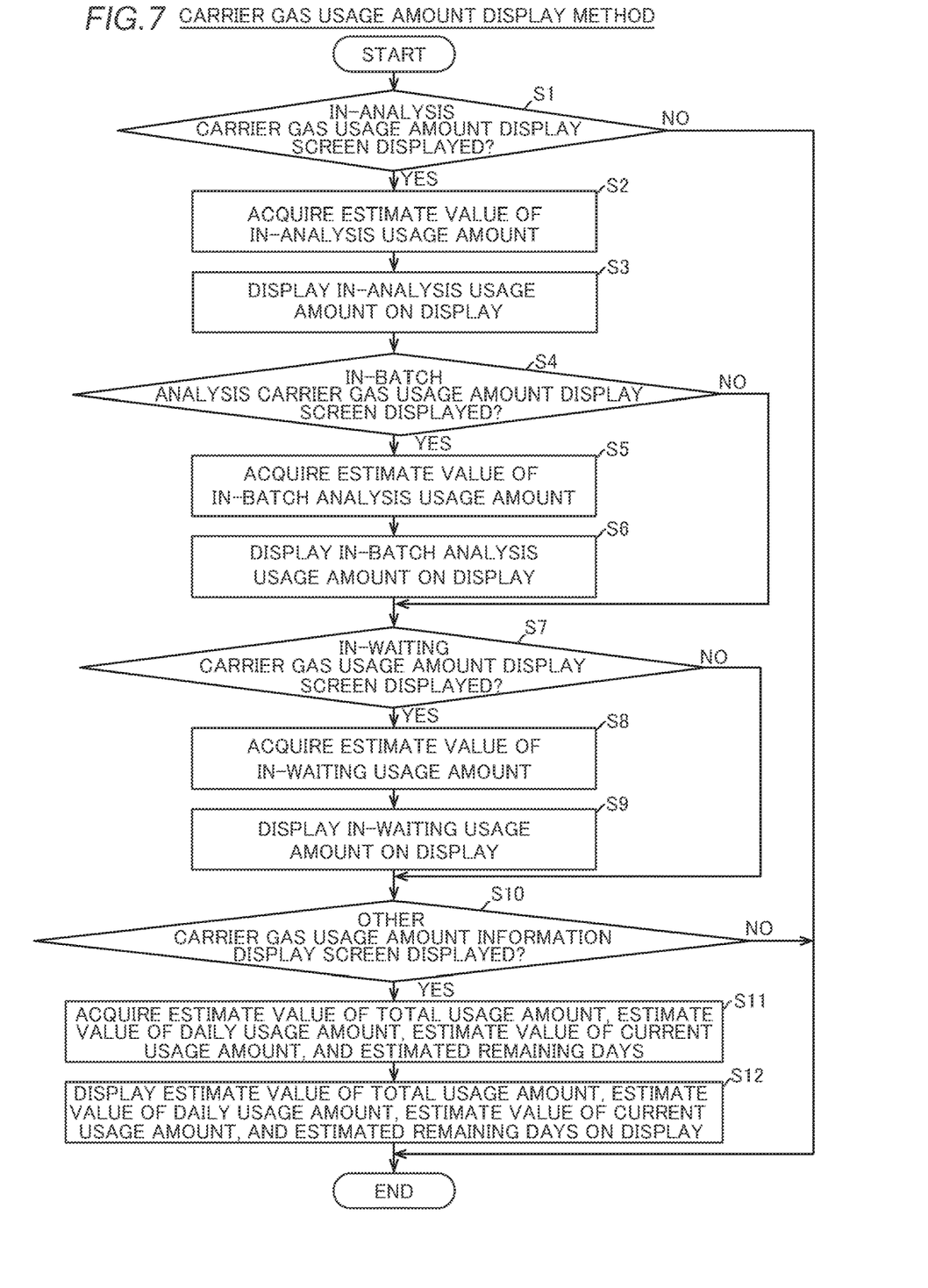
FIG. 7 is a flowchart showing a carrier gas usage amount display method implemented by a central controller of the gas chromatograph according to the first embodiment.

As shown in FIG. 7, in step S1, it is determined whether or not the in-analysis carrier gas usage amount display screen G1 has been displayed. At this time, the user performs an input operation to display the in-analysis carrier gas usage amount display screen G1 on the display 12. When it is determined that the in-analysis carrier gas usage amount display screen G1 has been displayed, the process advances to step S2, and when it is determined that the in-analysis carrier gas usage amount display screen G1 has not been displayed, the carrier gas usage amount display method is terminated.

In step S2, the estimate value of the in-analysis usage amount Au1 of the carrier gas is acquired based on the analysis time Tm for analyzing the sample gas generated from the sample in the sample gas generator 3, and the flow rate Af of the carrier gas supplied from the gas cylinder 101 to the sample gas generator 3 to carry the sample gas to the separation column 6. In step S3, the estimate value of the in-analysis usage amount Au1 is displayed on the display 12.

In step S4, it is determined whether or not the in-batch analysis carrier gas usage amount display screen G2 has been displayed. At this time, the user performs an input operation to display the in-batch analysis carrier gas usage amount display screen G2 on the display 12. When it is determined that the in-batch analysis carrier gas usage amount display screen G2 has been displayed, the process advances to step S5, and when it is determined that the in-batch analysis carrier gas usage amount display screen G2 has not been displayed, the process advances to step S7.

In step S5, the estimate value of the in-batch analysis usage amount Au2 of the carrier gas is acquired based on the in-analysis usage amount Au1 and the number of analyses performed in the batch analysis. In step S6, the estimate value of the in-batch analysis usage amount Au2 is displayed on the display 12.

In step S7, it is determined whether or not the in-waiting carrier gas usage amount display screen G3 has been displayed. At this time, the user performs an input operation to display the in-waiting carrier gas usage amount display screen G3 on the display 12. When it is determined that the in-waiting carrier gas usage amount display screen G3 has been displayed, the process advances to step S8, and when it is determined that the in-waiting carrier gas usage amount display screen G3 has not been displayed, the process advances to step S10.

In step S8, the estimate value of the in-waiting usage amount Au3 of the carrier gas is acquired based on the flow rate Aw of the carrier gas in the waiting state and the waiting time Tw. In step S9, the estimate value of the in-waiting usage amount Au3 is displayed on the display 12.

In step S10, it is determined whether or not the carrier gas usage amount information display screen G4 has been displayed. At this time, the user performs an input operation to display the carrier gas usage amount information display screen G4 on the display 12. When it is determined that the carrier gas usage amount information display screen G4 has been displayed, the process advances to step S11, and when it is determined that the carrier gas usage amount information display screen G4 has not been displayed, the carrier gas usage amount display method is terminated.

In step S11, the estimate value of the daily usage amount Ae2 is acquired by multiplying the number of analyses of the components of the sample gas in one day by the estimate value of the in-analysis usage amount Au1, and the estimate value of the total usage amount Ae1, the estimate value of the current usage amount Ae3, and the estimated remaining days Ae4 are acquired based on the estimate value of the daily usage amount Ae2. In step S12, the estimate value of the total usage amount Ae1, the estimate value of the daily usage amount Ae2, the estimate value of the current usage amount Ae3, and the estimated remaining days Ae4 are displayed on the display 2. After step S12, the carrier gas usage amount display method is terminated.

Advantages of First Embodiment

According to the first embodiment, the following advantages are obtained.

According to the first embodiment, as described above, the gas chromatograph 100 includes the central controller 10 configured or programmed to acquire the in-analysis usage amount Au1 of the carrier gas based on the analysis time Tm for analyzing the components of the sample gas and the flow rate of the carrier gas supplied from the gas cylinder 101 to the sample gas generator 3, and the display 12 to display the acquired in-analysis usage amount Au1. Accordingly, the user can check the in-analysis usage amount Au1 on the display 12 without going to a location at which the gas cylinder 101 is arranged, and thus the user can easily know the usage amount of the carrier gas in analyzing the components of the sample gas. Furthermore, the user can recognize the usage amount of the carrier gas in analyzing the components of the sample gas, and thus the user can recognize whether the usage amount in analysis is large or small. Consequently, the user can be reminded to make settings for the analysis such that the usage amount of the carrier gas in the analysis is reduced. Moreover, the user can check the in-analysis usage amount Au1 on the display 12, and thus the user can easily know the usage amount of the carrier gas in analyzing the components of the sample gas.

According to the first embodiment, as described above, the central controller 10 is configured or programmed to perform a control to acquire the estimate value of the in-analysis usage amount Au1 based on the analysis conditions including the analysis time Tm and the flow rate Af of the carrier gas and set by the user. Furthermore, the central controller 10 is configured or programmed to perform a control to display the acquired estimate value of the in-analysis usage amount Au1 on the display 12. Accordingly, the user can recognize the estimate value of the usage amount in analyzing the components of the sample gas, and thus the user can determine whether the usage amount of the carrier gas in analysis is large or small. Consequently, when determining that the usage amount of the carrier gas in analysis is large, the user can change the settings for analysis such that the usage amount of the carrier gas in analysis is reduced.

According to the first embodiment, as described above, the central controller 10 is configured or programmed to perform a control to acquire the flow rate Af of the carrier gas based on acquiring the flow rate Af of the carrier gas supplied from the gas cylinder 101 to the separation column 6 via the sample gas generator 3, and the discharge amount Af2 (Af3, Sa) of the carrier gas discharged from the gas cylinder 101 to the outside via the sample gas generator 3. Accordingly, the flow rate Af of the carrier gas supplied from the gas cylinder 101 to the sample gas generator 3 is the sum of the flow rate of the carrier gas supplied to the separation column 6 and the flow rate of the carrier gas discharged to the outside, and thus the flow rate Af of the carrier gas can be acquired appropriately.

According to the first embodiment, as described above, the central controller 10 is configured or programmed to perform a control to acquire the estimate value of the in-waiting usage amount Au3 based on the waiting conditions including the waiting time Tw during which the components of the sample gas are not analyzed, which is acquired based on the analysis time Tm, and the flow rate Aw of the carrier gas supplied from the gas cylinder 101 to the sample gas generator 3 in the waiting state, which is set by the user. Furthermore, the central controller 10 is configured or programmed to perform a control to display the acquired estimate value of the in-waiting usage amount Au3 on the display 12. Accordingly, the user can recognize not only the in-analysis usage amount Au1 but also the in-waiting usage amount Au3, and thus the user can recognize whether the usage amount of the carrier gas in the waiting state is large or small. Consequently, the user can be reminded to make settings in the waiting state such that the usage amount of the carrier gas in the waiting state is reduced.

According to the first embodiment, as described above, the central controller 10 is configured or programmed to perform a control to acquire the estimate value of the in-batch analysis usage amount Au2 of the carrier gas based on the estimate value of the in-analysis usage amount Au1 for each analysis in the batch analysis in which analysis of the components of the sample gas is sequentially performed a plurality of times, and the number of analyses performed in the batch analysis. Furthermore, the central controller 10 is configured or programmed to perform a control to display the acquired estimate value of the in-batch analysis usage amount Au2 on the display 12. Accordingly, the user can recognize the estimate value of the usage amount of the carrier gas in batch analysis, and thus the user can determine whether the usage amount of the carrier gas in batch analysis is large or small. Consequently, when determining that the usage amount of the carrier gas in batch analysis is large, the user can change the settings for batch analysis such that the usage amount of the carrier gas in batch analysis is reduced.

According to the first embodiment, as described above, the central controller 10 is configured or programmed to perform a control to acquire the estimate value of the daily usage amount Ae2 based on the number of analyses of the components of the sample gas in one day and the estimate value of the in-analysis usage amount Au1. Furthermore, the central controller 10 is configured or programmed to perform a control to display the acquired estimate value of the daily usage amount Ae2 on the display 12. Accordingly, the daily usage amount Ae2 is displayed on the display 12 such that the user can easily check the approximate usage amount of the carrier gas for one day.

According to the first embodiment, as described above, the gas cylinder 101 includes the gas cylinder 101 filled with a carrier gas. The central controller 10 is configured or programmed to perform a control to acquire the estimate value of the daily usage amount Ae2 based on the number of analyses of the components of the sample gas in one day and the estimate value of the in-analysis usage amount Au1, and acquire the estimated remaining days Ae4 left until the gas cylinder 101 becomes empty based on the estimate value of the daily usage amount Ae2 and the cylinder volume Vg of the gas cylinder 101. Furthermore, the central controller 10 is configured or programmed to perform a control to display the acquired estimated remaining days Ae4 on the display 12. Accordingly, the user can recognize the replacement time of the gas cylinder 101, and thus the user can replace the gas cylinder 101 at an appropriate time.

According to the first embodiment, as described above, the carrier gas usage amount display method includes step S2 of acquiring the in-analysis usage amount Au1 of the carrier gas based on the analysis time Tm for analyzing the sample gas generated from the sample in the sample gas generator 3, and the flow rate Af of the carrier gas supplied from the gas cylinder 101 to the sample gas generator 3 to carry the sample gas to the separation column 6. Furthermore, the carrier gas usage amount display method includes step S3 of displaying the in-analysis usage amount Au1 on the display 12. Accordingly, the user can check the in-analysis usage amount Au1 on the display 12 without going to the location at which the gas cylinder 101 is arranged, and thus the user can easily know the usage amount of the carrier gas in analyzing the components of the sample gas.

Second Embodiment

The configuration of a gas chromatograph 200 according to a second embodiment is now described with reference to FIGS. 8 to 10. In the second embodiment, an estimate value of an in-analysis usage amount Au1 including not only an estimate value of the flow rate Af of a carrier gas but also the flow rate Aw of a detector gas flowing through a detector 208 is displayed on a display 12, unlike the first embodiment. In the second embodiment, detailed description of the same or similar configurations as those of the first embodiment is omitted.

Figure 8:
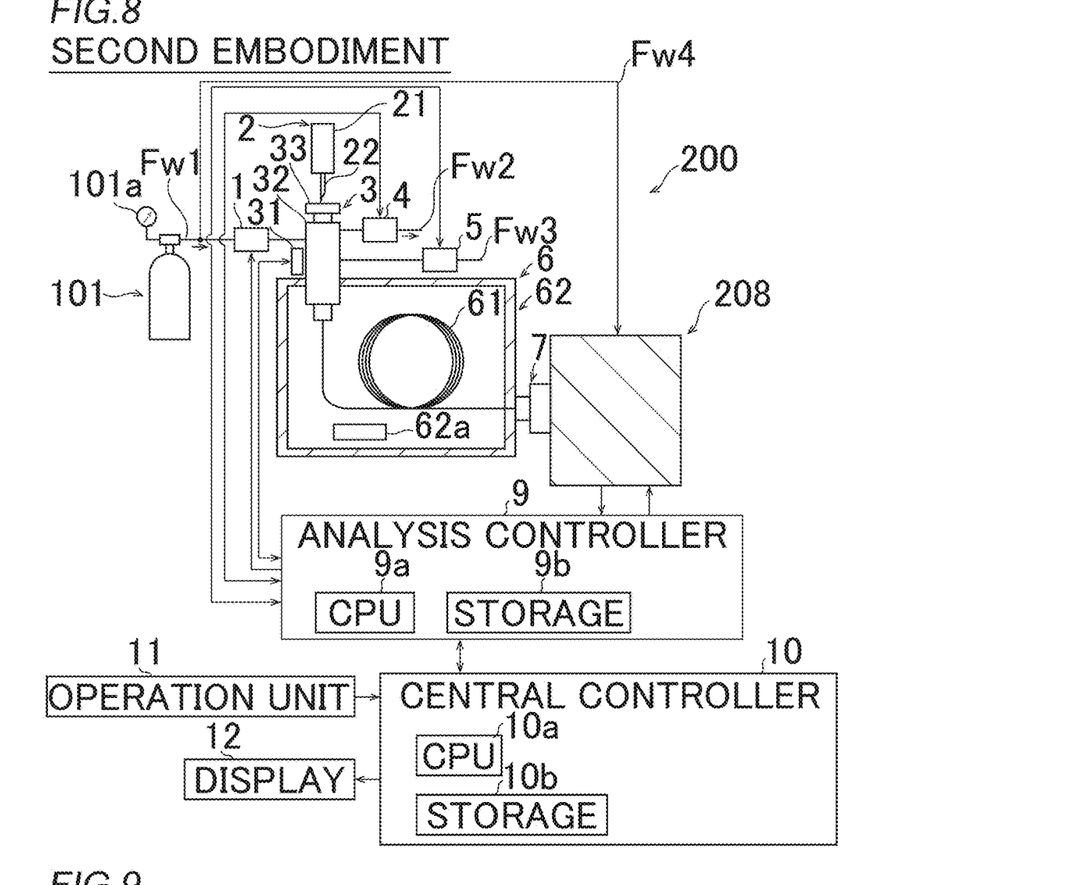
FIG. 8 is a schematic view showing the configuration of a gas chromatograph according to a second embodiment.

Referring to FIG. 8, the gas chromatograph 200 according to the second embodiment of the present invention includes a gas flow controller 1, an autosampler 2, a sample gas generator 3, a purge flow controller 4, a split flow controller 5, a separation column 6, an interface 7, the detector 208, an analysis controller 9, a central controller 10, an operation unit 11, the display 12, and a data processor 13. A gas cylinder 101 is connected to the gas chromatograph 200. The gas cylinder 101 is an example of a "gas supply source" in the claims. The central controller 10 is an example of a "controller" in the claims.

The detector 208 detects each component separated in the separation column 6. The detector 208 is a dielectric-barrier discharge ionization detector. The detector 208 detects the components separated in the separation column 6 while flowing, as a detector gas, the same gas as a carrier gas flowing through the separation column 6. The detector gas is helium gas, for example. The detector 208 and the gas cylinder 101 are connected to each other by a carrier gas introduction flow path Fw1 and a branch flow path Fw4 branched from the carrier gas introduction flow path Fw1.

In-Analysis Carrier Gas Usage Amount Display Screen

Figure 9:
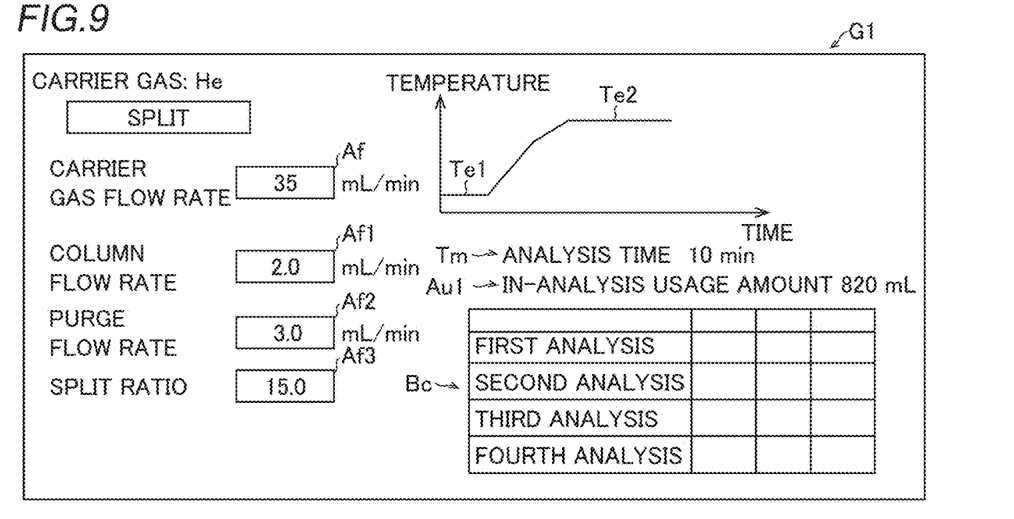
FIG. 9 is a schematic view showing an in-analysis carrier gas usage amount display screen for making settings for split analysis displayed on a display of the gas chromatograph according to the second embodiment.
Figure 10:
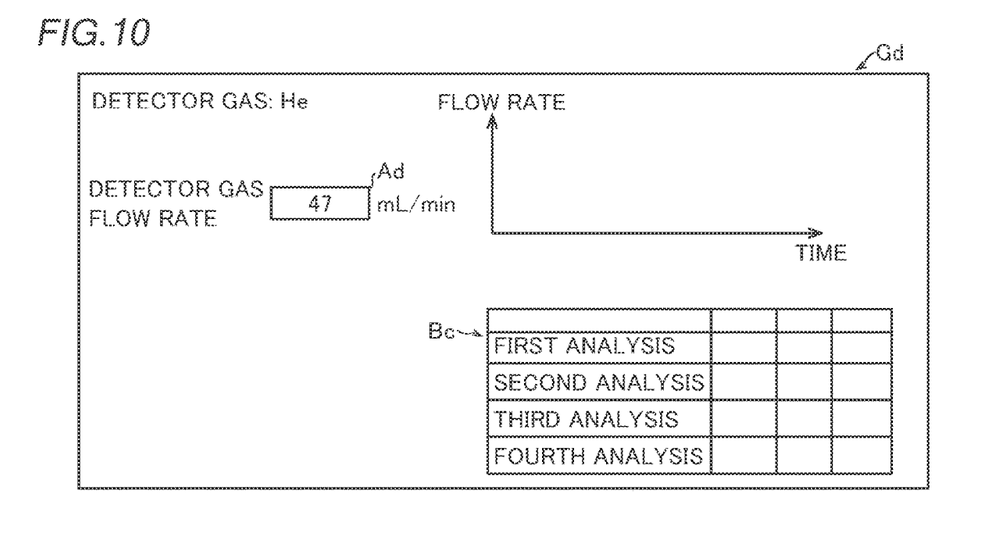
FIG. 10 is a schematic view showing an in-analysis detection gas usage amount display screen displayed on the display of the gas chromatograph according to the second embodiment.

As shown in FIGS. 9 and 10, the central controller 10 according to the second embodiment performs a control to display an in-analysis carrier gas usage amount display screen G1 on the display 12 before analyzing a sample gas.

Specifically, the central controller 10 performs a control to acquire an estimate value of an in-analysis usage amount Au1 based on an analysis time Tm, an estimate value of the flow rate Af of the carrier gas, and an estimate value of the flow rate Ad of the detector gas supplied from the gas cylinder 101 to the detector 208, which are set by a user, and display the estimate value of the in-analysis usage amount Au1 on the display 12. Numerical values of a column flow rate Af1, a purge flow rate Af2, a split ratio Af3, the flow rate Af of the carrier gas, the analysis time Tm, and the in-analysis usage amount Au1 shown in FIG. 9 are examples, and are not limited to these.

The flow rate Ad of the detector gas refers to the flow rate of the carrier gas that flows through the detector 208 when analysis is performed. The flow rate Ad of the detector gas is preset by a user's input operation before analysis of components of the sample gas. That is, the central controller 10 performs a control to set a numerical value of the flow rate Ad of the detector gas based on receiving a user's numerical value (47 [mL/min], for example) input operation to a field of the flow rate Ad of the detector gas of an in-analysis detection gas usage amount display screen Gd. The remaining configurations of the second embodiment are similar to those of the first embodiment.

Advantages of Second Embodiment

According to the second embodiment, similarly to the first embodiment, the gas chromatograph 200 includes the central controller 10 configured or programmed to acquire the in-analysis usage amount Au1 of the carrier gas based on the analysis time Tm for analyzing the components of the sample gas and the flow rate of the carrier gas supplied from the gas cylinder 101 to the sample gas generator 3, and the display 12 to display the acquired in-analysis usage amount Au1. Accordingly, the usage amount in analyzing the components of the sample gas can be easily known.

According to the second embodiment, as described above, the gas chromatograph 200 includes the detector 208 to detect the components separated in the separation column 6 while flowing, as the detector gas, the same gas as the carrier gas flowing through the separation column 6. The central controller 10 is configured or programmed to perform a control to acquire the estimate value of the in-analysis usage amount Au1 based on the analysis time Tm, the estimate value of the flow rate Af of the carrier gas, and the estimate value of the flow rate Ad of the detector gas supplied from the gas cylinder 101 to the detector 208, which are set the user. The central controller 10 is configured or programmed to perform a control to display the estimate value of the in-analysis usage amount Au1 on the display 12. Accordingly, the estimate value of the in-analysis usage amount Au1 including the usage amount of the detector gas supplied from the gas cylinder 101, which is the same as the carrier gas, can be displayed on the display 12, and thus the user can appropriately know the estimate value of the gas usage amount in analyzing the sample gas. The remaining advantages of the second embodiment are similar to those of the first embodiment.

Modified Examples

The embodiments disclosed this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

For example, while the carrier gas is helium in each of the aforementioned first and second embodiments, the present invention is not limited to this. In the present invention, the carrier gas may be an alternative carrier gas such as hydrogen or nitrogen. In this case, the detector gas in the second embodiment is also changed to the same alternative carrier gas as the carrier gas.

While the estimate value of the in-analysis usage amount Au1 is displayed on the display 12 in each of the aforementioned first and second embodiments, the present invention is not limited to this. In the present invention, a measured value of the in-analysis usage amount based on an integrated value of the flow rate of the carrier gas measured by a flow rate sensor when the sample gas is being analyzed may alternatively be displayed on the display.

While the other carrier gas usage amount information display screen G4 including the estimate value of the total usage amount Ae1, the estimate value of the daily usage amount Ae2, the estimate value of the current usage amount Ae3, and the estimated remaining days Ae4 is displayed on the display 12 in each of the aforementioned first and second embodiments, the present invention is not limited to this. In the present invention, as in a modified example shown in FIG. 11, in addition to the estimate value of the total usage amount Ae1, the estimate value of the daily usage amount Ae2, the estimate value of the current usage amount Ae3, and the estimated remaining days Ae4, an estimate value of a weekly usage amount Ae5 (an example of an "estimate value of a predetermined period usage amount" in the claims), an estimate value of a monthly usage amount Ae6 (an example of an "estimate value of a predetermined period usage amount" in the claims), and the remaining amount Ae7 in the cylinder (an example of a "remaining amount in the gas cylinder" in the claims) may alternatively be displayed on the display 12.

Figure 11:
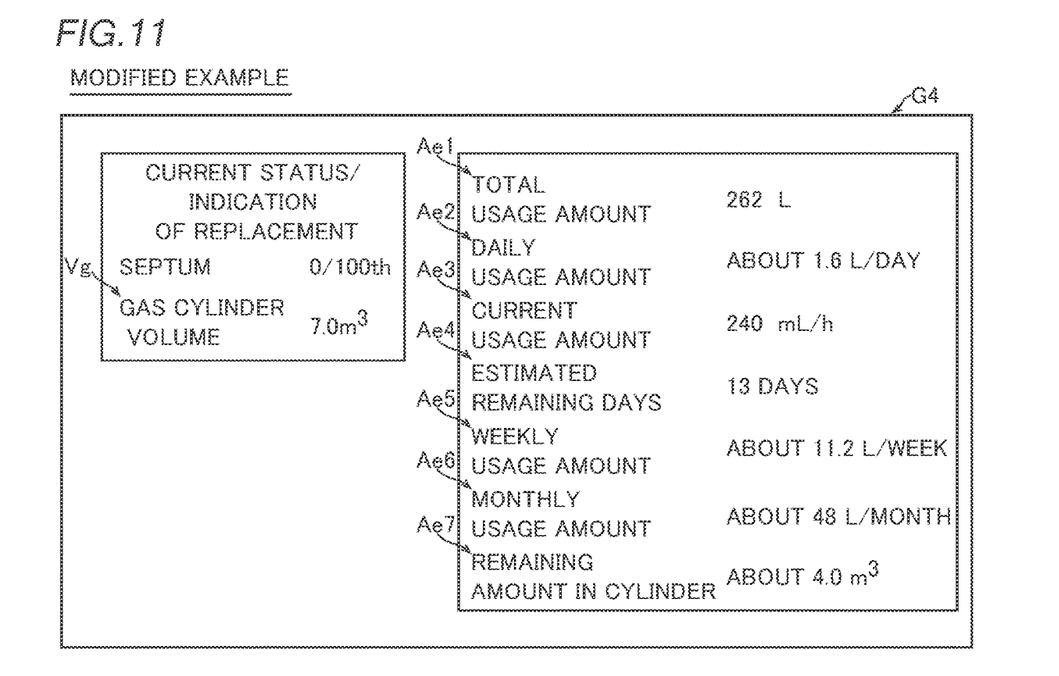
FIG. 11 is a schematic view showing an other carrier gas usage amount information display screen displayed on a display of a gas chromatograph according to a modified example of the first and second embodiments.

That is, the central controller 10 is configured or programmed to perform a control to acquire the estimate value of the predetermined period usage amount Ae5 (Ae6) based on the estimate value of the daily usage amount Ae2 and a predetermined period (one week or one month, for example), and display the acquired estimate value of the predetermined period usage amount Ae5 (Ae6) on the display 12. Accordingly, the predetermined period usage amount Ae5 (Ae6) is displayed on the display 12 such that the user can easily check the approximate usage amount of the carrier gas for the predetermined period.

Furthermore, the central controller 10 is configured or programmed to perform a control to acquire the estimate value of the remaining amount Ae7 in the cylinder (the remaining amount in the gas cylinder 101) based on the estimate value of the in-analysis usage amount Au1 and the cylinder volume Vg of the gas cylinder 101, and display the acquired estimate value of the remaining amount Ae7 in the cylinder on the display 12. Accordingly, the user can roughly recognize the remaining amount Ae7 in the gas cylinder 101, and thus the user can roughly recognize the replacement time of the gas cylinder 101.

While the other carrier gas usage amount information display screen G4 is displayed on the display 12 in each of the aforementioned first and second embodiments, the present invention is not limited to this. In the present invention, the carrier gas usage amount information display screen may alternatively be displayed not only on the display but also on a monitor provided in the separation column or the detector.

While on the display 12, the in-analysis usage amount Au1 is displayed on the in-analysis carrier gas usage amount display screen G1, and the in-waiting usage amount Au3 is displayed on the in-waiting carrier gas usage amount display screen G3 separate from the in-analysis carrier gas usage amount display screen G1 in each of the aforementioned first and second embodiments, the present invention is not limited to this. In the present invention, a display screen on which both the in-analysis usage amount and the in-waiting usage amount are displayed may alternatively be displayed on the display.

While the central controller 10 (controller) performs a control to acquire the estimate value of the in-analysis usage amount Au1 based on the analysis conditions including the analysis time Tm and the flow rate Af of the carrier gas and set by the user's input operations in each of the aforementioned first and second embodiments, the present invention is not limited to this. In the present invention, the controller may alternatively perform a control to acquire the estimate value of the in-analysis usage amount based on an analysis time acquired based on a duration of the waiting state set by a user's input operation, and the flow rate of the carrier gas in analysis acquired based on the flow rate of the carrier gas in the waiting state set by a user's input operation.

While the column 61 is a capillary column in each of the aforementioned first and second embodiments, the present invention is not limited to this. In the present invention, the column may alternatively be a packed column or another column.

While the central controller 10 (controller) performs a control to acquire the flow rate Af of the carrier gas based on acquiring each of the column flow rate Af1, the purge flow rate Af2, and the split ratio Af3 set by receiving the user's input operations when the split analysis is performed in the aforementioned first embodiment, the present invention is not limited to this. In the present invention, the controller may alternatively perform a control to acquire the flow rate of the carrier gas based on reading the column flow rate, the purge flow rate, and the split ratio set by the user from the storage to acquire them when the split analysis is performed.

While the central controller 10 (controller) performs a control to acquire the flow rate Af of the carrier gas based on acquiring each of the column flow rate Af1, the purge flow rate Af2, the split ratio Af3, and the sampling time Sa set by receiving the user's input operations when the splitless analysis is performed in each of the aforementioned first and second embodiments, the present invention is not limited to this. In the present invention, the controller may alternatively perform a control to acquire the flow rate of the carrier gas based on reading each of the column flow rate, the purge flow rate, the split ratio, and the sampling time set by the user from the storage to acquire them when the splitless analysis is performed.

While the central controller 10 (controller) performs a control to display the in-batch analysis carrier gas usage amount display screen G2 on the display 12 while analyzing the sample gas in each of the aforementioned first and second embodiments, the present invention is not limited to this. In the present invention, the controller may alternatively perform a control to display the in-batch analysis carrier gas usage amount display screen on the display before analyzing the sample gas.

While the central controller 10 (controller) performs a control to acquire the estimate value of the in-analysis usage amount Au1 based on the analysis time Tm, the estimate value of the flow rate Af of the carrier gas, and the estimate value of the flow rate Ad of the detector gas supplied from the gas cylinder 101 to the detector 208, which are set the user, and display the estimate value of the in-analysis usage amount Au1 on the display 12 in the aforementioned second embodiment, the present invention is not limited to this. In the present invention, the controller may alternatively perform a control to acquire the estimate value of the in-analysis usage amount based on reading the analysis time, the estimate value of the flow rate of the carrier gas, and the estimate value of the flow rate of the detector gas supplied from the gas supply source to the detector set by the user from the storage, and display the estimate value of the in-analysis usage amount on the display.

While the control process operations of the central controller 10 (controller) are described using a flowchart in a flow-driven manner in which processes are performed in order along a process flow for the convenience of illustration in each of the aforementioned first and second embodiments, the present invention is not limited to this. In the present invention, the control process operations of the controller may alternatively be performed in an event-driven manner in which the processes are performed on an event basis. In this case, the control process operations may be performed in a complete event-driven manner or in a combination of an event-driven manner and a flow-driven manner.

Aspects

It will be appreciated by those skilled in the art that the exemplary embodiments described above are specific examples of the following aspects.
(Item 1)
A gas chromatograph 100 (200) comprising:
a sample gas generator 3 configured to generate a sample gas from an injected sample;
a separation column 6 connected such that the sample gas generated in the sample gas generator 3 is introduced thereinto and configured to separate components of the introduced sample gas;
a gas supply source 101 configured to supply a carrier gas to the sample gas generator 3 to carry the sample gas from the sample gas generator 3 to the separation column 6 when the components of the sample gas are analyzed;
a controller 10 configured or programmed to acquire an in-analysis usage amount Au1 of the carrier gas based on an analysis time Tm for analyzing the components of the sample gas, and a flow rate Af of the carrier gas supplied from the gas supply source 101 to the sample gas generator 3; and
a display 12 configured to display the in-analysis usage amount Au1 acquired by the controller 10.
(Item 2)
The gas chromatograph 100 (200) according to item 1, wherein the controller 10 is configured or programmed to perform a control to acquire an estimate value of the in-analysis usage amount Au1 based on analysis conditions including the analysis time Tm and the flow rate Af of the carrier gas, the analysis conditions being set by a user, and display the acquired estimate value of the in-analysis usage amount Au1 on the display 12.
(Item 3)
The gas chromatograph 100 (200) according to item 2, wherein the controller 10 is configured or programmed to perform a control to acquire the flow rate Af of the carrier gas based on acquiring the flow rate Af of the carrier gas supplied from the gas supply source 101 to the separation column 6 via the sample gas generator 3, and a discharge amount Af2 (Af3, Sa) of the carrier gas discharged from the gas supply source 101 to an outside via the sample gas generator 3.
(Item 4)
The gas chromatograph 100 (200) according to item 2, wherein the controller 10 is configured or programmed to perform a control to acquire an estimate value of an in-waiting usage amount Au3 based on waiting conditions including a duration Tw of a waiting state in which the components of the sample gas are not analyzed, the duration Tw being acquired based on the analysis time Tm, and the flow rate Aw of the carrier gas supplied from the gas supply source 101 to the sample gas generator 3 in the waiting state, the flow rate Aw being set by the user, and display the acquired estimate value of the in-waiting usage amount Au3 on the display 12.
(Item 5)
The gas chromatograph 100 (200) according to item 2, wherein the controller 10 is configured or programmed to perform a control to acquire an estimate value of an in-batch analysis usage amount Au2 of the carrier gas based on the estimate value of the in-analysis usage amount Au1 for each analysis in batch analysis in which analysis of the components of the sample gas is sequentially performed a plurality of times, and a number of analyses performed in the batch analysis, and display the acquired estimate value of the in-batch analysis usage amount Au2 on the display 12.
(Item 6)
The gas chromatograph 100 (200) according to item 2, wherein the controller 10 is configured or programmed to perform a control to acquire an estimate value of a daily usage amount based on a number of analyses of the components of the sample gas in one day and the estimate value of the in-analysis usage amount Au1, and display the acquired estimate value of the daily usage amount Ae2 on the display 12.

(Item 7)

The gas chromatograph 100 (200) according to item 6, wherein the controller 10 is configured or programmed to perform a control to acquire an estimate value of a predetermined period usage amount Ae5 (Ae6) based on the estimate value of the daily usage amount Ae2 and a predetermined period, and display the acquired estimate value of the predetermined period usage amount Ae5 (Ae6) on the display 12.

(Item 8)

The gas chromatograph 100 (200) according to item 2, wherein
the gas supply source 101 includes a gas cylinder 101 filled with the carrier gas; and
the controller 10 is configured or programmed to perform a control to acquire an estimate value of a remaining amount Ae7 in the gas cylinder based on the estimate value of the in-analysis usage amount Au1 and a cylinder volume Vg of the gas cylinder 101, and display the acquired estimate value of the remaining amount Ae7 in the gas cylinder on the display 12.

(Item 9)

The gas chromatograph 100 (200) according to item 2, wherein
the gas supply source 101 includes a gas cylinder 101 filled with the carrier gas; and
the controller 10 is configured or programmed to perform a control to acquire an estimate value of a daily usage amount Ae2 based on a number of analyses of the components of the sample gas in one day and the estimate value of the in-analysis usage amount Au1, acquire estimated remaining days Ae4 left until the gas cylinder becomes empty based on the estimate value of the daily usage amount Ae2 and a cylinder volume Vg of the gas cylinder, and display the acquired estimated remaining days Ae4 on the display 12.

(Item 10)

The gas chromatograph 100 (200) according to item 2, further comprising:
a detector 208 configured to detect the components separated in the separation column 6 while flowing, as a detector gas, a same gas as the carrier gas flowing through the separation column 6; wherein
the controller 10 is configured or programmed to perform a control to acquire the estimate value of the in-analysis usage amount Au1 based on the analysis time Tm, an estimate value of the flow rate Af of the carrier gas, and an estimate value of a flow rate Ad of the detector gas supplied from the gas supply source 101 to the detector 208 that are set the user, and display the estimate value of the in-analysis usage amount Au1 on the display 12.

(Item 11)

A carrier gas usage amount display method comprising:
acquiring an in-analysis usage amount Au1 of a carrier gas based on an analysis time Tm for analyzing a sample gas generated from a sample in a sample gas generator 3, and a flow rate Af of the carrier gas supplied from a gas supply source 101 to the sample gas generator 3 to carry the sample gas to a separation column 6; and
displaying the in-analysis usage amount Au1 on a display 12.

What is claimed is:

1. A gas chromatograph comprising:
a sample gas generator configured to generate a sample gas from an injected sample;
a separation column connected such that the sample gas generated in the sample gas generator is introduced thereinto and configured to separate components of the introduced sample gas;
a gas supply source configured to supply a carrier gas to the sample gas generator to carry the sample gas from the sample gas generator to the separation column when the components of the sample gas are analyzed;
a controller configured or programmed to acquire an in-analysis usage amount of the carrier gas based on an analysis time for analyzing the components of the sample gas, and a flow rate of the carrier gas supplied from the gas supply source to the sample gas generator; and
a display configured to display the in-analysis usage amount acquired by the controller.

2. The gas chromatograph according to claim 1, wherein the controller is configured or programmed to perform a control to acquire an estimate value of the in-analysis usage amount based on analysis conditions including the analysis time and the flow rate of the carrier gas, the analysis conditions being set by a user, and display the acquired estimate value of the in-analysis usage amount on the display.

3. The gas chromatograph according to claim 2, wherein the controller is configured or programmed to perform a control to acquire the flow rate of the carrier gas based on acquiring the flow rate of the carrier gas supplied from the gas supply source to the separation column via the sample gas generator, and a discharge amount of the carrier gas discharged from the gas supply source to an outside via the sample gas generator.

4. The gas chromatograph according to claim 2, wherein the controller is configured or programmed to perform a control to acquire an estimate value of an in-waiting usage amount based on waiting conditions including a duration of a waiting state in which the components of the sample gas are not analyzed, the duration being acquired based on the analysis time, and the flow rate of the carrier gas supplied from the gas supply source to the sample gas generator in the waiting state, the flow rate being set by the user, and display the acquired estimate value of the in-waiting usage amount on the display.

5. The gas chromatograph according to claim 2, wherein the controller is configured or programmed to perform a control to acquire an estimate value of an in-batch analysis usage amount of the carrier gas based on the estimate value of the in-analysis usage amount for each analysis in batch analysis in which analysis of the components of the sample gas is sequentially performed a plurality of times, and a number of analyses performed in the batch analysis, and display the acquired estimate value of the in-batch analysis usage amount on the display.

6. The gas chromatograph according to claim 2, wherein the controller is configured or programmed to perform a control to acquire an estimate value of a daily usage amount based on a number of analyses of the components of the sample gas in one day and the estimate value of the in-analysis usage amount, and display the acquired estimate value of the daily usage amount on the display.

7. The gas chromatograph according to claim 6, wherein the controller is configured or programmed to perform a control to acquire an estimate value of a predetermined period usage amount based on the estimate value of the daily usage amount and a predetermined period, and display the acquired estimate value of the predetermined period usage amount on the display.

8. The gas chromatograph according to claim 2, wherein
the gas supply source includes a gas cylinder filled with the carrier gas; and
the controller is configured or programmed to perform a control to acquire an estimate value of a remaining amount in the gas cylinder based on the estimate value of the in-analysis usage amount and a cylinder volume of the gas cylinder, and display the acquired estimate value of the remaining amount in the gas cylinder on the display.

9. The gas chromatograph according to claim 2, wherein
the gas supply source includes a gas cylinder filled with the carrier gas; and
the controller is configured or programmed to perform a control to acquire an estimate value of a daily usage amount based on a number of analyses of the components of the sample gas in one day and the estimate value of the in-analysis usage amount, acquire estimated remaining days left until the gas cylinder becomes empty based on the estimate value of the daily usage amount and a cylinder volume of the gas cylinder, and display the acquired estimated remaining days on the display.

10. The gas chromatograph according to claim 2, further comprising:
a detector configured to detect the components separated in the separation column while flowing, as a detector gas, a same gas as the carrier gas flowing through the separation column; wherein
the controller is configured or programmed to perform a control to acquire the estimate value of the in-analysis usage amount based on the analysis time, an estimate value of the flow rate of the carrier gas, and an estimate value of a flow rate of the detector gas supplied from the gas supply source to the detector that are set the user, and display the estimate value of the in-analysis usage amount on the display.

11. A carrier gas usage amount display method comprising:
acquiring an in-analysis usage amount of a carrier gas based on an analysis time for analyzing a sample gas generated from a sample in a sample gas generator, and a flow rate of the carrier gas supplied from a gas supply source to the sample gas generator to carry the sample gas to a separation column; and
displaying the in-analysis usage amount on a display.

* * * * *